ALARM SYSTEM CONNECTED TO A TELEPHONE SUBSCRIBER'S CIRCUIT SO AS TO TRANSMIT AN ALARM THROUGH THE CENTRAL OFFICE WITHOUT INTERFERING WITH NORMAL TELEPHONE OPERATION

Filed April 26, 1966 5 Sheets-Sheet 1

INVENTOR
CLARENCE A. LOVELL
BY [signature]
ATTORNEY

Dec. 16, 1969 C. A. LOVELL 3,484,553

ALARM SYSTEM CONNECTED TO A TELEPHONE SUBSCRIBER'S CIRCUIT SO AS TO TRANSMIT AN ALARM THROUGH THE CENTRAL OFFICE WITHOUT INTERFERING WITH NORMAL TELEPHONE OPERATION

Filed April 26, 1966 5 Sheets-Sheet 2

ALARM SYSTEM CONNECTED TO A TELEPHONE SUBSCRIBER'S CIRCUIT SO AS TO TRANSMIT AN ALARM THROUGH THE CENTRAL OFFICE WITHOUT INTERFERING WITH NORMAL TELEPHONE OPERATION

Filed April 26, 1966 5 Sheets-Sheet 3

United States Patent Office 3,484,553

Patented Dec. 16, 1969

3,484,553
ALARM SYSTEM CONNECTED TO A TELEPHONE SUBSCRIBER'S CIRCUIT SO AS TO TRANSMIT AN ALARM THROUGH THE CENTRAL OFFICE WITHOUT INTERFERING WITH NORMAL TELEPHONE OPERATION

Clarence Anding Lovell, 6709 Danforth St., McLean, Va. 22101

Filed Apr. 26, 1966, Ser. No. 551,487
Int. Cl. H04m *11/04*
U.S. Cl. 179—2 7 Claims

ABSTRACT OF THE DISCLOSURE

This system is designed to be connected to a telephone subscriber's line in a manner to allow the giving of an alarm from the subscriber's premises over his line through the telephone central office to an alarm receiving station without interfering with normal telephone operation, except the use of the line for a short alarm transmitting interval.

This invention relates to alarm systems and particularly to systems wherein existing common and widely used communication facilities are employed for the purpose of transmitting alarms in addition to their normal functions. The advantages of such use have been widely recognized and many schemes have been proposed for accomplishing this purpose. The means proposed for such use have generally been costly to a degree that seriously restricts their uses, have in some way interfered with the working of the communication system, or both. It is an object of this invention to provide such services over telephone systems at costs so low that the service will be widely used, will not interfere with normal telephone service and will afford additional revenue to the proprietors of the telephone plant.

It is an object of this invention to provide simple means connected to the telephone line at the subscriber's premises to transmit alarms, means at the central office for recognizing the difference between an alarm and a telephone call and which, on receiving an alarm indication, will use the switching and control means thereat to extend the alarm to an alarm bureau without requiring the transmission of any digital information from the alarm station.

An object of the invention is to use a telephone line from a subscriber's premises to a central office network to reach an alarm bureau without interfering with the normal working of the telephone other than to preempt the use of the telephone line for the very short time it takes to transmit an alarm.

The alarm will consist of a simulated telephone call from the alarm station on the telephone line and the central office network will recognize the difference between this and a genuine telephone call by two means, first a conventional party test which shows the call to be coming in from a particular party of a multiparty line and second through the class of service which the central office has arranged to provide for that given line. While the alarm station responds to a conventional party test by displaying a ground connection on the tip if the alarm station is connected as the tip station or no ground on either the tip or the ring if the alarm station is connected as the ring station, it is nevertheless identified to the alarm bureau by the directory number of the telephone station connected to the same line, which number is transmitted to the attendant whereby he identifies the alarm station and takes actions appropriate to the circumstances. Thus even such intangibles as the telephone numbering plan are undisturbed. The only interference which the present arrangement offers to the telephone plant is that a telephone on a two party line to which an alarm station is connected is barred since the alarm station occupies that position. Otherwise normal individual and two party telephone service may be given without interference.

In a telephone system in which subscribers stations are extended over two conductor lines to automatic central offices, each line is given a particular class of service and means are provided in the central office to recognize the class of service to which any line is entitled. When a subscriber is to be given two party service, his station is connected to a line of a two party class and generally both parties on a two party line have the same class of service. This class of service requires a party test to be made, a ground connection to the tip conductor indicating a tip party station and the absence of the ground connection indicating a ring party station so that the central office controls may properly identify the station calling for charging and other purposes. When a line is assigned an alarm class, the method of working is different for the ring party and the tip party, whereby a call made by the one party is extended in the normal manner while a call made by the other party is diverted from routine working and extended to an alarm bureau without requiring the alarm station to take any further action.

It may therefore be said that a feature of this invention is the provision of a new class of service assigned to lines having a telephone station and at least one alarm station connected to it, the use of this class of service indication and a party test to distinguish alarms from telephone calls and switching control means for extending each to its appropriate destination, the same means being generally used for both purposes.

It is conventional to assign two separate and distinct numbers to the two parties of a two party line. A feature for the telephone station of a combined telephone and alarm line and the automatic identification of both the telephone and the alarm station by the number of the telephone station even though the party test differentiates between the two. This combined service line is thus a conventional individual line which may call and be called in the conventional manner, but on which an alarm station connected thereto may call but may not be called. This newly arranged line thus operates in the conventional manner of an individual line but will respond to a two party test to distinguish alarm calls from telephone calls.

A feature of one embodiment of the invention is the provision of means in the alarm station to simulate the initial action of originating a call by that party of a two party line set aside for alarm service as a result of the operation of an alarm sensor to indicate a non-standard condition and the use of a party test at the central office and the class of service of the line to recognize that the call is originated by an alarm station, thus identifying the call as an alarm.

It is conventional in telephone working when the class of service of a line indicates two party working to make a test prior to the connection of dial tone thereto to determine which of the two parties is making the call, the so-called tip station being identified by a ground connection to the tip conductor placed there by the tip station switchhook operation, whereas the absence of such a ground identifies the so-called ring station. Where an alarm station is used as one party, it simulates a call to the extent of establishing a bridge across the line and a connection between tip and ground if it is the tip party and no ground connection if it is the ring party, but differs from an ordinary call by the different class of service indication for the line. Calls from the telephone station of a line having this class of service are handled conventionally whereas if the class of service and party test indication is that the call is an alarm station call then switching to an alarm bureau is carried out without further action by the alarm station.

It is to be noted that the telephone station on such a combined service line may be connected either as an individual line station with the ringer effectively connected between the tip and ring conductors or it may be connected as the other station of a two party line with the ringer effectively connected between the conductor which characteriszes such station and ground. Since the telephone station may call and be called, and the alarm station may call but not be called, when a call is being made to the telephone station the ringing current may be applied in the manner appropriate for the ringer connections employed.

In accordance with the present invention, a given party station of a two party line is reserved for alarm service on lines also characterized as alarm service lines by the particular class of service provided. Where the class of service indicates alarm service and the party test proves that a call is coming in from that party station designated the alarm station, the call will be diverted from the normal telephone working and given special attention and directed to the alarm bureau. Thus the telephone working over that line will be temporarily suspended for the purpose of the alarm working, the normal response of the telephone facilities being halted.

In most schemes of this nature, where a telephone line is used to transmit alarms the transmission of such an alarm interferes with telephone service thereafter by placing an irreversible condition on the telephone line which had to await attention by maintenance personnel or removable by timing mechanisms. Alarm station means, is by its nature a single shot means and will require manual adjustment after each operation. The sensor, generally used, is a single shot means and must be replaced, repaired, or reset after each operation. Hence a feature of the present invention is the provision of means whereby the adverse conditions placed on the telephone line by the alarm network may be removed and the telephone on such line restored to full service.

The substation circuit used for alarm indications consists generally of three items connected in series and bridged from the tip conductor to the ring conductor and this series circuit is normally open so as not to interfere with the telephone working over the telephone station connected to the same line. The first item is a normally open sensor responsive to the condition, such as a fire, which is to be reported. The second is a means for simulating a telephone call and which brings forth the normal telephone reactions at the central office but which, due to the class of service arrangements thereat, is diverted to an alarm bureau, and the third is a means to clear the bridge thrown across the line by the working of the sensor since this last facility by its very nature would tend to maintain his bridge and therefore interfere with any further telephone working.

Where the said given party station reserved for alarm services is the tip party station then the three items mentioned may be a sensor to close the circuit, a slow releasing relay responsive to the line current in the said closed circuit, used to place a ground connection on the tip conductor to identify the alarm station as a tip station, and means such as a fuse to open the said closed circuit after the attendant at the alarm bureau to which said simulated call has been diverted has recorded the number of the calling station.

Where the said given station reserve for alarm service is the ring party station then the said relay used as described above to place a ground mark on the tip conductor may be used instead to open the bridge circuit established by the sensor to thus restore the line to full telephone service. In accordance with one arrangement which may be provided, this said relay may be a magnetically latching relay which opens its own contacts and which contacts have conventional snap action whereby the winding of the relay will not be opened until the contacts controlled thereby have moved toward an opened position from which they cannot be recalled. Such a relay may be used to open the circuit including its own winding. By way of example, such a relay may be a special magnetically latched relay known as a ferreed which will maintain closed contacts in the said bridge circuit until it becomes operated under control of the attendant at the alarm bureau. In accordance with an alternative arrangement this relay may be polarized for the same purpose of maintaining closed contacts in the bridge circuit until the attendant at the alarm bureau controls this relay to open said contacts and restore the line to unhindered telephone service.

Thus, one of the three elements in the said bridge circuit is a snap action means under control of the attendant at the alarm bureau to which the simulated telephone call is diverted to open the circuit established by the sensor. Such an element may be a fuse responsive to an increased current flow, a relay responsive to a like increased current flow or a reversed direction current flow, any one of which, opening the bridge circuit will restore the telephone capabilities of the line. The outstanding characteristics of such a circuit opening means is its irreversible operation, by which once the circuit opening operation has started it will continue until completed and will not merely cause the relay to buzz as a normally closed pair of contacts in series with the winding of the relay. A fuse has such characteristics and certain relays may be given this snap action characteristic.

The closure of the said bridge circuit, simulating the removal of the telephone from its cradle, by the operation of the sensor, is the same in all cases so that the clearing of the line for normal telephone use consists of an opening of the thus established bridge circuit. In certain cases this is done by the blowing of a fuse in this bridge circuit by the application thereto of a greater than normal potential, in response to action by the attendant at the alarm bureau, a marginal operation. In another case a special relay, known as a ferreed, is poled to open its contacts but will not respond to normal line current. When, as in the first and third cases, a greater than normal potential is applied to the line, this special relay will respond and its contacts having become opened will remain in this condition. In still another case a polar relay is employed which will respond to a reversal of the current flow in the line under the control of the attendant at the alarm bureau. In all cases the bridge circuits which was closed by the sensor is opened to terminate the simulated call.

Another feature of the invention used in the first case is the use of a slow releasing relay in the alarm network used to hold over the operation of this relay for the very short period necessary to make the party tests. In conventional two party working the ground applied to the tip conductor to mark the originating call as from a tip station comes from a switchhook operation and therefore maintains its connection to the tip conductor while the line into the central office network is opened in order to make the party test. In the case of an alarm station this ground connection is simulated by the relay in such alarm network and would therefore tend to release during the party test but is maintained operated by its slow release characteristics and does not release over the very short time taken for this purpose.

In the other cases where the alarm circuit is identified as a ring party showing no such ground connection, such a slow releasing relay is not used since there is no marking ground to be maintained.

Another feature of the invention is the use of resistance units in the alarm networks whereby varying line resistance values may be compensated and the total resistance of the alarm circuit may be brought to a standard value which is substantially necessary where marginal operations are employed.

Another feature of the invention is the provision of means for extending the alarm calls to an alarm bureau without requiring the alarm station to dial the alarm bureau number or otherwise transmit any digital information.

In the telephone central office network, the application of dial tone to an originating line is the signal for the calling subscriber to dial the number of the called subscriber so that nothing further will take place until this operation has been completed and the originating register through its sequencer has reached the so-called "dialing complete" stage. In the case of a cell from an alarm station where no dialing or transmission of digital information from the alarm station takes place this "dialing complete" stage has to be reached automatically. Hence, in accordance with one embodiment of the last said feature, applicable to offices offering the so-called abbreviated dialing service, the party of the line entitled to the new class of service is known to make abbreviated dialing calls only. Since all calls identified as alarm calls are to be extended to the alarm bureau it will be recognized that no dialing is needed and the number of the alarm bureau will be extracted from a storage means, inserted in the originating register and the register sequencer advanced to the "dialing complete" stage.

In accordance with another embodiment of this feature, applicable to offices serving lines with more than one type of dialing device, requiring more than one type of originating register, the new class of service will indicate that a special type of originating register is required. This register operates in the normal manner for telephone calls. It is modified so that on alarm party calls no dial tone is applied to the line, the loop circuit is opened at the register and the pulsing contact of a dialing mechanism preset to the alarm bureau number is inserted to pulse that number into the register.

Another feature of the invention is a means for identifying the alarm station to attendants at the alarm bureau. According to one embodiment of this feature, applicable to offices with CAMA (Central Automatic Messages Accounting) trunks, the line to the alarm bureau appears on the switching network in an out-trunk position and is classed as a CAMA out trunk. A new route relay is added in the office to route all alarm calls to this trunk. The regular outpulsing routine on out trunks to CAMA offices includes pulsing both the calling and called numbers. The aarm bureau receives and checks its own number to validate the call as from an alarm station, registers and displays the calling line number and operates an audible alarm to alert an attendant.

Another feature of this invention is a trunk circuit which operates in the normal manner of a CAMA trunk to extend a call from an alarm station to the alarm bureau and which, in response to a signal from the alarm bureau will transmit a signal which removes the bridge established by the operation of the alarm sensor from the telephone line, cause ringing current to be thereupon suitably applied to the line through the network connection established in reporting the alarm, to ring the associated telephone station, trip ringing on answer, and establish a talking path between the alarm bureau and the said associated telephone without requiring the alarm bureau attendant to dial the directory number of the said telephone whereby the alarm bureau attendant can alert the occupants of the building to the alarmed condition and verify the existence of the non standard condition reported.

Another feature of the invention is the minimization of the cost of changes in the central office necessary to provide the alarm service widely. In accordance with this feature, the lines to the alarm bureau appear on the switching network as out trunks, at least one of which must be added to each office, and as many of the supervisory and control functions unique to the alarm service as possible are concentrated in these out trunk circuits. While one such trunk will serve all the alarm calls in an office, a second may be provided for reliability and continuity of service in case of trouble in the trunk or its associated circuitry.

The alarm station consists of a normally open series circuit connected in between the tip and the ring conductors of the telephone line and has three elements, a sensor responsive to an unstandard condition, which is to be reported, to close said circuit as a telephone lifted from its cradle closes a circuit from the tip to the ring of its line, a means such as a relay or even a given resistance unit to constitute a proper bridge circuit and in a first case a relay to operate to place a mark on the line to indicate a tip station, in a second case a relay to respond to a marginal condition at a later stage to open the said circuit established by the sensor and in a third case a resistance unit to bring the said circuit to a standard resistance value so that the circuit will properly respond to said marginal condition to operate means to open said circuit and a third means consisting of a fuse or a relay responsive to said marginal condition to open said circuit to clear the same for normal telephone use. In all three cases the resistance of said bridge circuit is brought up to a standard value so that when the attendant at the alarm bureau causes a higher potential value to be placed on the circuit to produce a marginal condition it will operate means to open said circuit, in the first and third cases the blowing of a fuse and in the second case the operation of a special relay, poled to respond to line current which normally is insufficient but which will respond to the increased current produced by the said marginal condition. In still another variation the said relay may be polarized and may have snap action contacts whereby the opening of the circuit is irreversibly completed as a result of a reversed potential and in which case no marginal condition is imposed on the relay.

Another feature of the invention is a means whereby a subscriber may be given more than one alarm station. It will be remembered that an alarm station is identified by the combination of the class of service provided for his line plus the report of the party test. The class of service may indicate that a tip station will be an alarm network or, alternatively, that the ring station will be an alarm network or even that both stations will be alarm networks and for these three alternatives a separate class of service means will be provided since no two arrangements of this nature may be given to any one line. It will be seen that the class of service arrangements already provided for normal telephone service is extensive and it will be understood that the provision of new and different classes of service is a simple matter so that applicant proposes to provide one class of service in which a tip station test will indicate an alarm network, another in which a ring station will indicate an alarm network and a third in which both the ring station and the tip station will indicate an alarm network. In this last case the line is used exclusively for alarm purposes even though it is connected into the telephone switching network.

Thus, a subscriber having a single telephone line extending from his premises may have one or two telephones or one or two alarm stations connected thereto. If the subscriber has two telephone lines, then he may have any combination of telephones and alarm stations so that it is possible for a subscriber to have alarm means to report a number of different contingencies.

Another feature of this invention is the means provided in combination in the special trunk circuit which in case of failure to successfully complete the report of the nonstandard condition to the alarm bureau and receive acknowledgement of the report in the form of a signal from the alarm bureau will, after a timed interval, disconnect the line from the telephone network without first removing the bridge from the line and restore the trunk circuits at the central office and at the alarm bureau to idle conditions, the bridge at the alarm station causing the line relay at the central office to operate, and cause the entire process of reporting the alarm to the alarm bureau to be carried out repeatedly until an acknowledgement is received from the alarm bureau.

The drawings consist of five sheets having seven figures as follows.

FIGS. 1A, 1B and 1C are schematic showings of alternative alarm station networks, FIG. 1A showing an alarm network which may be connected as a trip station on a two party line and which features a slow releasing relay to hold a ground connection to the tip conductor during the party test, FIG. 1B showing an alarm network which may be connected as a ring station on a two party line and which features a magnetically latching relay having snap action contacts in series with the winding to open the bridge circuit established by the sensor, and FIG. 1C showing another alarm network which may be connected as a ring station on a two party line and which features the use of resistance units in the said bridge circuit established by the sensor to bring the total resistance of the alarm network to a predetermined value so that a fuse in this bridge circuit may be blown when a marginal application of high potential is applied to the line to open this bridge.

Figure 4:
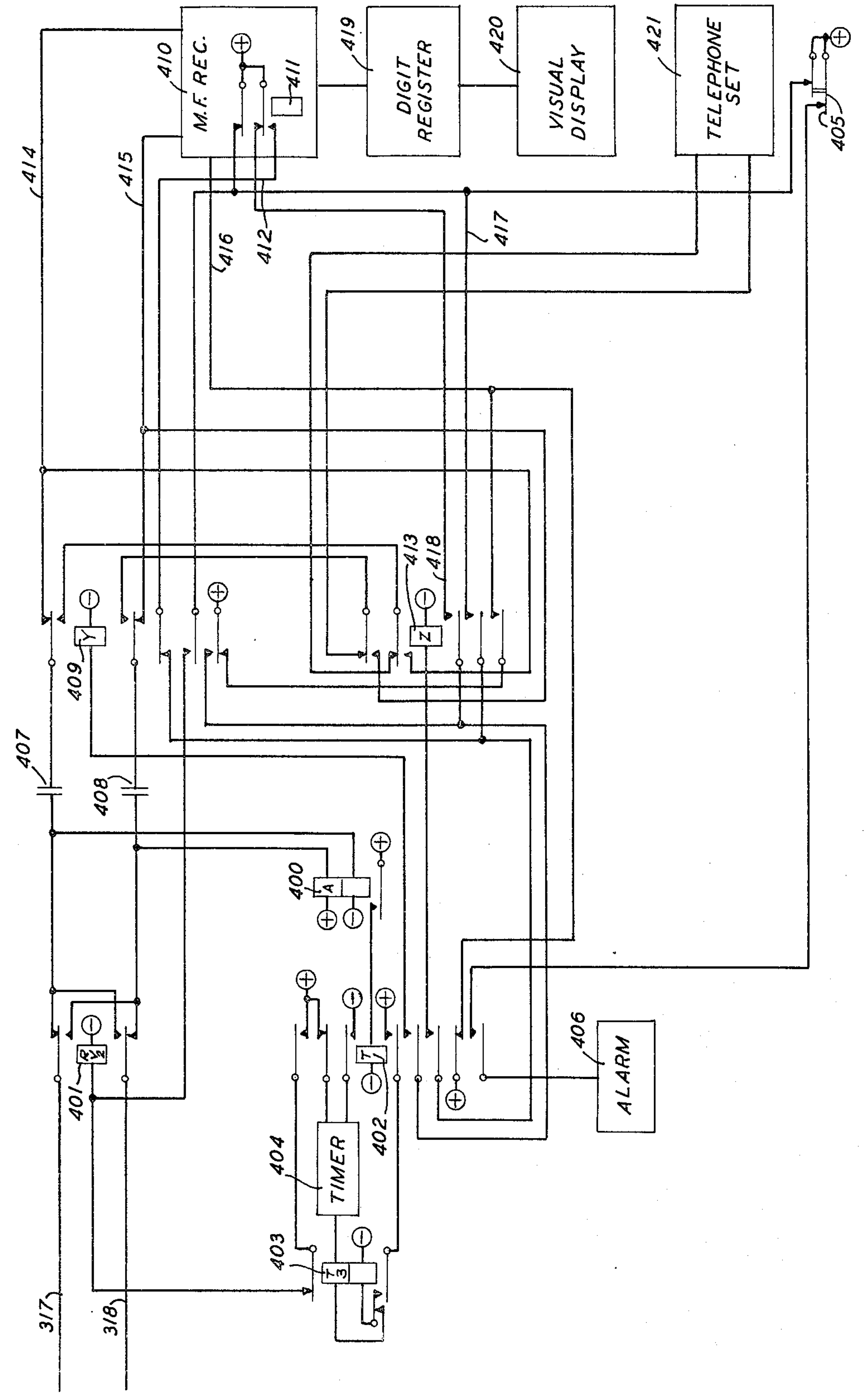
Figure 5:
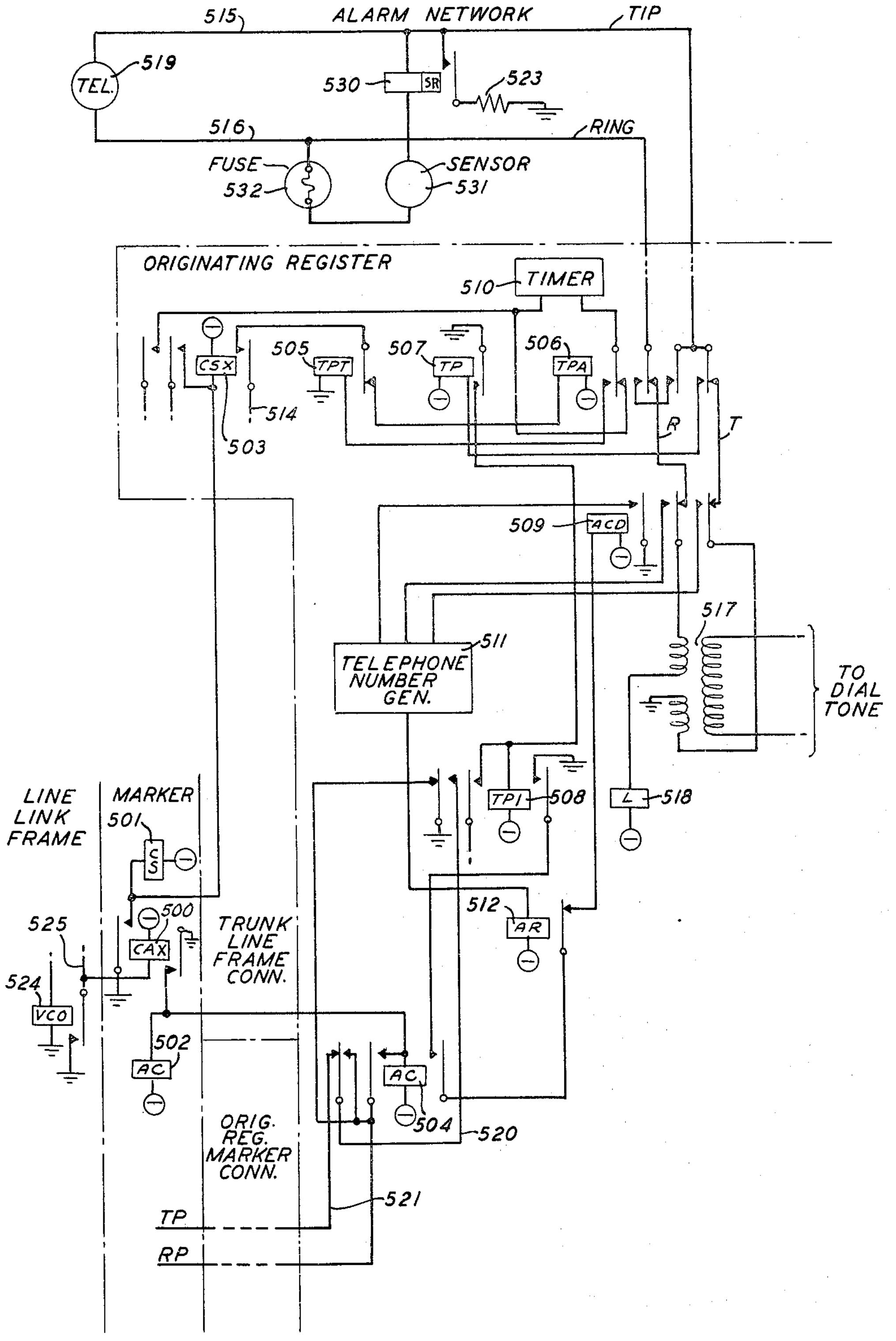

FIG. 4 is a schematic showing of the far end of this special trunk at the alarm bureau showing the means at the disposal of an attendant thereat for transmitting a signal back to the calling alarm station for dismissing the simulated call to thus clear the telephone line to which such alarm network is connected for normal telephone service, and FIG. 5 is a schematic showing of the switching means in the central office network indicating the means by which a simulated originating call from an alarm station may be diverted to an alarm bureau when the conventional party test indicates the call to be from an alarm station.

In accordance with the present invention, a conventional two conductor telephone line extending from a subscriber's premises to a central office network has at the subscriber's end of the line a telephone station connected thereto and, in the present case, also an alarm network bridged from the tip to the ring conductor. This alarm network normally presents an open circuit to the line since one of the three elements thereof is a normally open sensor. The network therefore presents no interference to the telephone calls over said line since nothing in the alarm network will respond to any of the operations over the telephone station nor will the alarm network interfere with the use of the telephone excepting for the brief period after the operation of the sensor and until the attendant at the alarm bureau acts to clear the line by opening the bridge which the sensor established.

For the purpose of the present disclosure it is assumed that the alarm station is connected to a line served by a crossbar office of the type disclosed and claimed in United States Patent 2,585,904, granted to A. J. Busch on Feb. 19, 1952. The tip conductor in the normal state is connected through the contacts of a cut-off relay to ground and the ring conductor is connected through like contacts of this relay and thence through the winding of a line relay to battery whereby a bridge established by the alarm station, as explained, or by the removal of the telephone from its cradle at a normal telephone station will operate the said line relay.

Figure 1A:
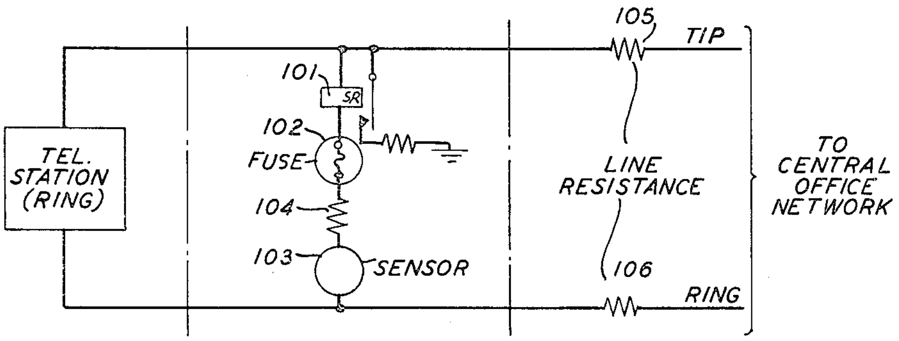
Figure 1B:
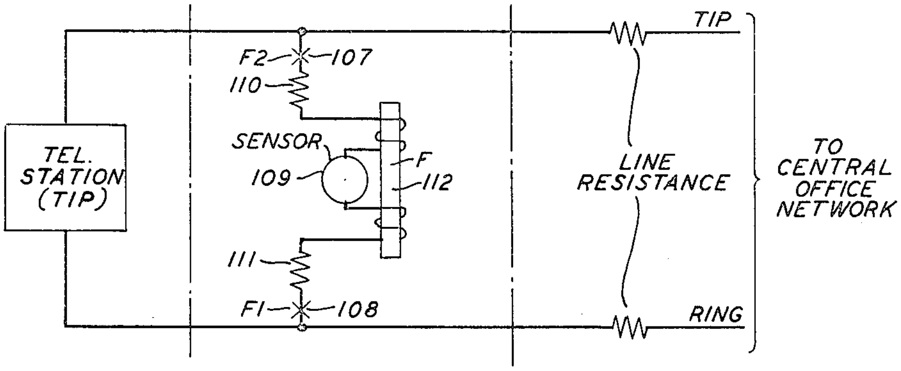
Figure 1C:
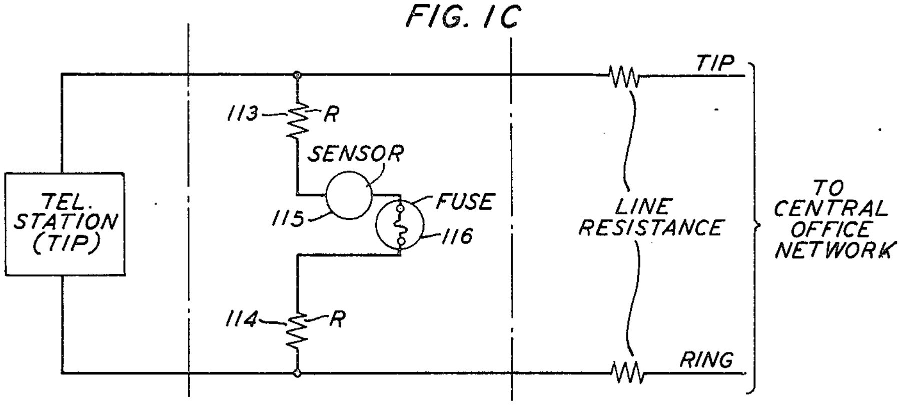

As shown in FIGS. 1A, 1B and 1C, the telephone line on the subscriber's premises is a two conductor line having a tip conductor conventionally connected in the central office to the ground termination of the line and a ring conductor connected in the central office to the battery termination of the line reached through a central office relay, such as a line relay. When a bridge from one conductor to the other is established at the station as by the removal of the telephone from its cradle this relay will respond to signal an originating call.

Bridged across this line, as shown in FIG. 1A, at the subscriber's end thereof is a telephone station 100 and an alarm network consisting of the series arrangement of three elements, a relay 101, a line clearing means such as a fuse 102, and a normally open sensor 103. A resistance unit 104 may be inserted in this circuit so that the total resistance of the line including the line resistance represented by the units 105 and 106 will come to a predetermined standard value to facilitate the marginal operation of the fuse 102. When the sensor responds to an alarm condition and completes this bridge circuit between the tip conductor and the ring conductor, the relay 101 will operate from the normal battery and ground connections in the central office and by connecting ground to the tip conductor will simulate the mark put on a line in a normal tip station call. Conventionally when an originating call is made, a so-called party test is made always just prior to the application of dial tone to the calling line so that in party line working the proper party may be known and charged. Thus, when an alarm condition arises on the subscriber's premises and the telephone line thereat has an alarm network connected thereto as shown in FIG. 1A, the sensor in operating causes a simulated originating call to be made and this places a simulated tip party mark on the tip conductor of the line.

It will be set forth hereinafter that the so-called party test determines whether or not this tip party mark is present, by disconnecting for an instant all central office battery and ground connections and connecting to the telephone conductors a tip party relay havig a connection to battery so that if the tip party mark is present and the tip party relay responds it will be known that the originating call is from a tip station, or where an alarm network is connected to the line, an alarm station. The opening of the line and the fleeting disconnection of the battery connection which caused the operation of the relay 101 will tend to allow relay 101 to release, but this instant is extremely short and relay 101 has slow release characteristics so that the tip station mark provided by the relay 101 is maintained through the party test period.

The alarm network connected to the telephone line has a normally closed means 102 here shown as a fuse which may be blown from the central office in order to open this bridge established across the line by the operation of the sensor 103 so that as soon as the alarm is given the attendant at the alarm bureau may return the telephone line to normal telephone service. The relay 101 will release and remove the ground connection from the tip conductor.

In order to provide reliable marginal characteristics to the fuse 102, the total resistance of the telephone line including the line resistance may be adjusted to a standard value by the insertion of a resistance unit 104 at the time the alarm station is installed.

FIG. 1B shows an alternative arrangement in which the alarm network is the ring station on the line so that when a bridge is established and the party test is performed the absence of any ground connection will report the call as coming in from an alarm network. The bridge circuit, extending from the tip conductor to the ring conductor includes a pair of normally closed contacts 107 and 108, a normally open sensor 109, resistance units 110 and 111 and the windings of a relay 112 wired in series with its own contacts 107 and 108. Such contacts have a snap action whereby upon the proper energization of the relay the contacts will move to open position but will not open the circuit which they control until their movement has gone beyond the point of recall so that even though they open the energizing circuit of the relay they will nevertheless latch in position to hold open such circuit.

The relay 112 of FIG. 1B may be either one of two forms, a special magnetically latched relay responsive to a marginal condition or a conventional magnetically latched polarized relay responsive to a reversed line current.

This special relay, known as a ferreed, described in Patents 2,995,637, issued Aug. 6, 1961, and 3,002,066, issued Sept. 26, 1961, is one which may be magnetically latched. Briefly, it has a core constructed of a material such as a ferrite which exhibits two stable remanent magnetization states and as used herein is poled to respond to line current to open its normally closed contacts. The current through its windings is in the direction to overcome the magnetization of the core but is normally insufficient to do so until the attendant at the alarm bureau increases the potential on the line and therefore causes the energization of the relay to be reversed so that the relay contacts will open and will thereafter remain open until maintainence personnel have visited the station to change or replace the sensor, at which time the relay may be latched with its contacts closed. The relay therefore responds to a marginal condition, the resistance units 110 and 111 being adjusted so that the total resistance of the circuit is brought up to a predetermined value.

FIG. 1B may also represent an alternative arrangement wherein a conventional polar relay is employed so that the attendant at the distant alarm bureau may cause an operation thereof by a reversal of the line current rather than by a marginal application of current. In each case the contacts operate by snap action so that having been put into movement by the winding of the relay they will reach a point from which they will not return by the time the circuit they control is opened, whereupon they snap into their open position and become latched therein.

FIG. 1C shows another alternative in which no relay is used but wherein the resistance value of the line is at least roughly adjusted to a predetermined value and a fuse acts as the marginal agent which opens the bridge circuit when the attendant at the alarm bureau increases the potential applied to the line. Resistances 113 and 114 are placed in the bridge circuit constituting the alarm network in series with a normally open sensor 115 and a normally closed circuit fuse 116. The current flowing through the fuse 116 after the sensor has established the bridge is insufficient to blow the fuse but when the potential applied to the line by the attendant is raised the fuse will give way and the bridge will be removed thus restoring the line for normal telephone service.

In each of FIGS. 1A, 1B and 1C, the alarm is given by establishing a bridge across the line used for this dual purpose and this acts like the making of a telephone call but by a combination of the class of service provided for this line and by the results of the party test it is known that the call is not a telephone call but rather an alarm and the extension of the connection at the central office will be diverted to a trunk leading to the alarm bureau.

Figure 2:
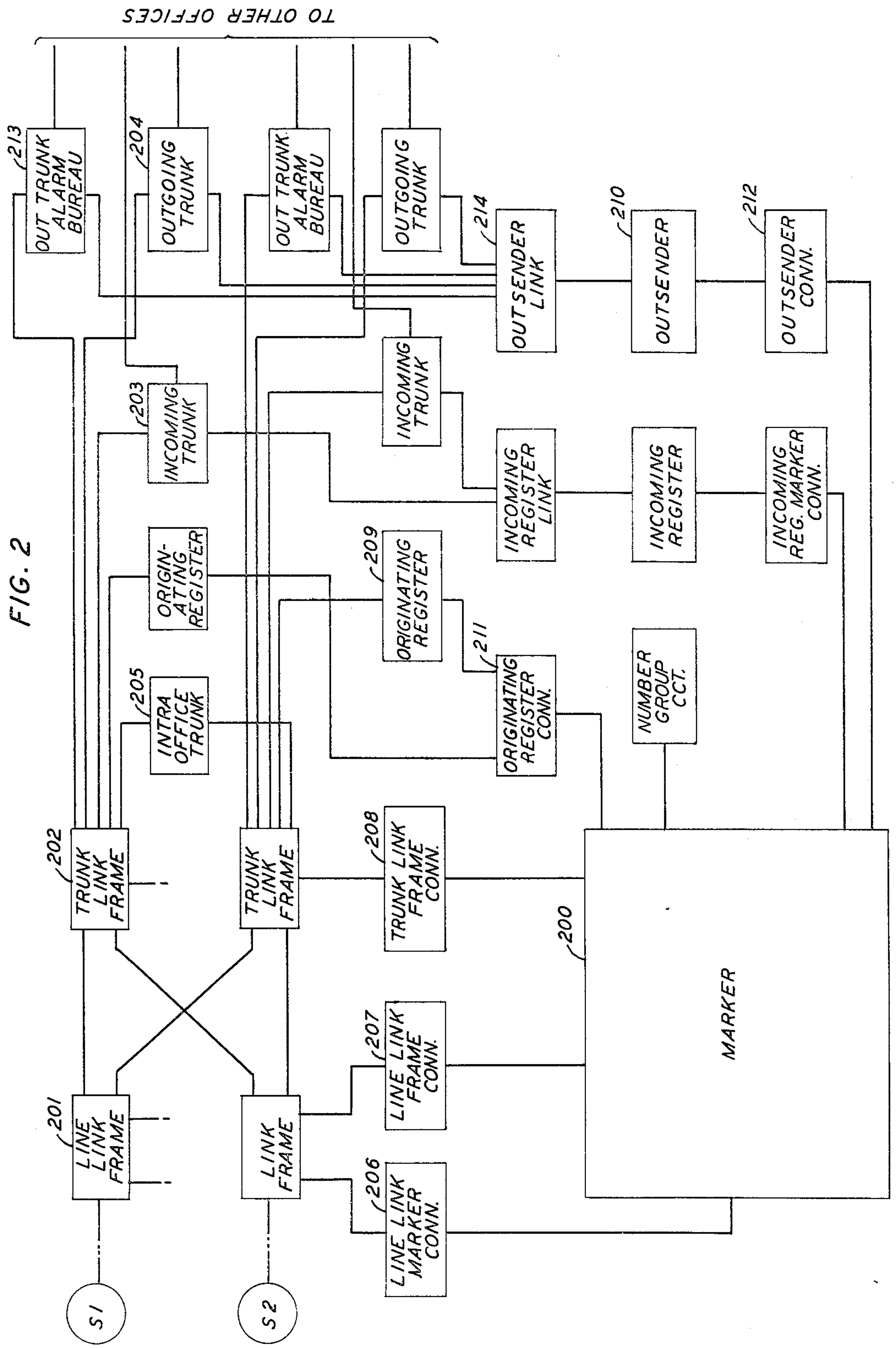
FIG. 2 is a schematic showing of the various switching devices used in a central office network of the crossbar type.

In an office of the type disclosed in the above identified Busch Patent and shown schematically in FIG. 2, connections are established by means of a series of crossbar switches, controlled by common control means 200 called a marker. These switches are arranged on two sets of frames, line link frames 201, etc. and trunk link frames 202, etc. All lines have an individual appearance on a line link frame and most trunks have an individual apperance on a trunk link frame. Trunks 203 and 204 used for inter-office calls have two appearances on a trunk link frame and two connections are established with the intra-office trunk 205 for connecting two local lines.

The marker 200 has access to the line link frames by means of two connectors a line link marker connector 206, which is under control of a calling line to select and connect with an idle marker and a line link connector 207, controlled by the marker and used in operating the line link switches during the establishment of a call.

The lines in each vertical file on a line link frame have the same class of service and are provided with a class of service indication so that the marker, on an originating call, comes under control of a means peculiar to the class of service of the line making such a call.

Trunk link connectors 208 are provided which serve the marker, not only in operating the trunk link switches but also in selecting an idle trunk leading to the required destination.

To assist the marker, originating register 209 and outsenders 210 are employed for receiving and transmitting line designatitons. The originating register 209 has an individual appearance on the trunk link frame 202 and is connected to the calling line through the switching frames. When the called line designation has been registered, the originating register 209 calls in an idle marker 200 by means of an originating register marker connector 211. The originating register 209 then transfers the designation and other recorded information to the marker 200 and releases, after which the marker completes the desired connection.

For an inter-office call, the marker selects an idle outgoing sender 210 of the proper type and connects thereto by means of the outsender marker connector 212. When both a sender and a trunk have been selected, the outsender link is operated to connect the sender with the trunk. The marker transfers the necessary information to the outsender 210 and then may release. The outsender transmits pulses to the second office. The pulses generated by a sender may serve to set an incoming register or may operate the switches directly, the type of sender being selected in accordance with the requirements of the second office.

The extension of a telephone line through a line link frame such as 201, a trunk link frame such as 203 is completely set forth in the said Busch Patent. If instead of a conventional outgoing trunk 204, a special outgoing trunk 213 to the alarm bureau is selected, the simulated call is extended over the circuits of FIGS. 3 and 4, in which the out trunk 213 is shown in more detail in FIG. 3.

When the originating register has received the designation of the alarm bureau, it selects an idler marker and transmits the alarm bureau designation to the selected marker, together with other information necessary for establishing the connection between the alarm station and the alarm bureau and then releases.

From the alarm bureau designation, the marker operates a route relay, which controls the operation of the trunk link connector and the outsender connector to select a trunk leading to the alarm bureau and an outsender capable of transmitting both the called line number and the calling line number by multifrequency pulses. In addition it prepares the outsender link for connecting the selected sender to the selected trunk.

During these operations, the marker closes a circuit which extends to conductor 300, opertaing relay 301. Relay 301 connects ground to the winding of hold magnet 302, individual to the trunk of FIG. 3, in the sender link. Magnet 302 operates to complete the connection of the trunk of FIG. 3 to the selected outsender and is then held under control of the sender.

Figure 3:
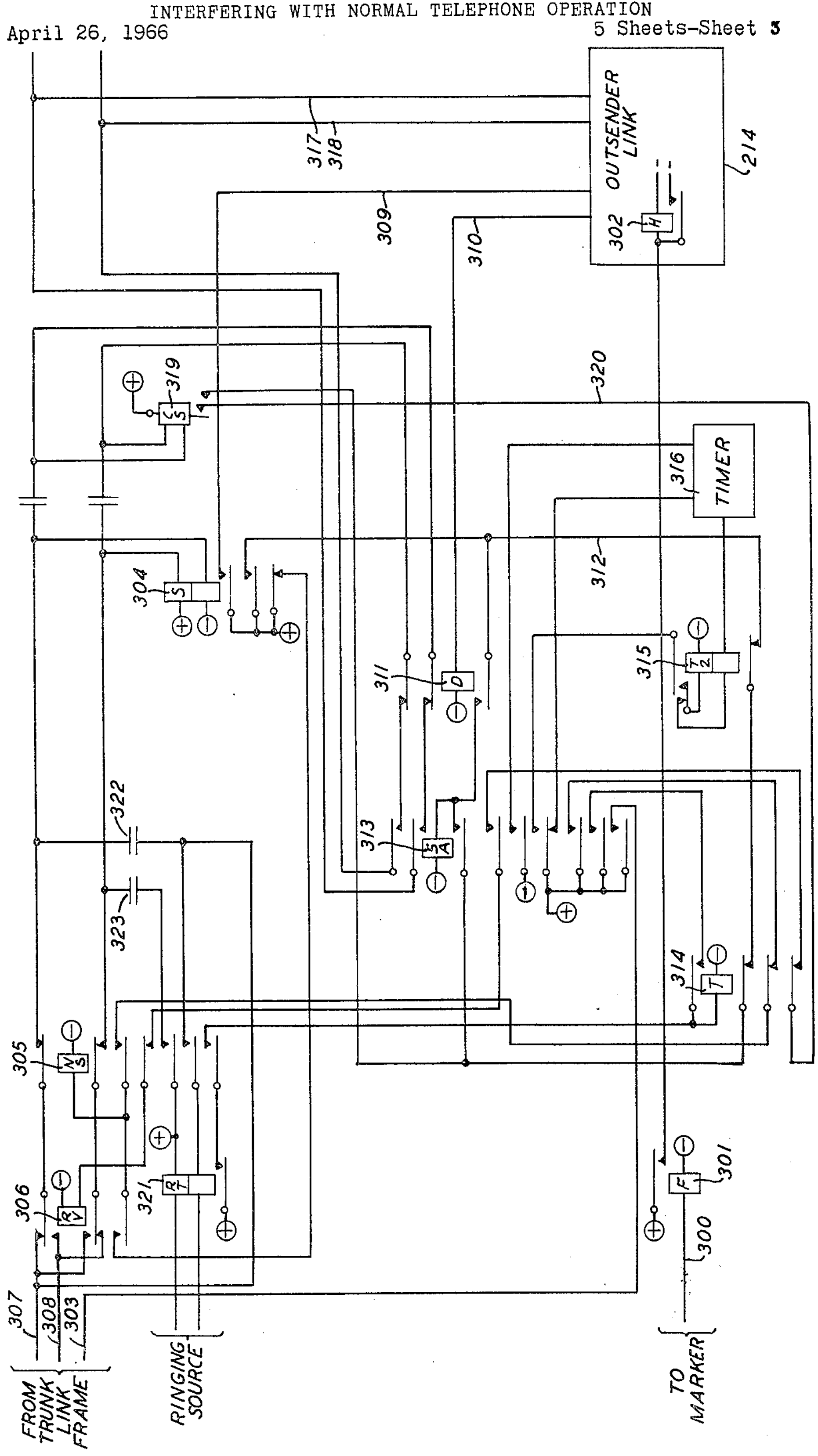
FIG. 3 is a schematic showing of the near end of the special trunk in the central office network to which the simulated call is switched.

After the trunk-sender connection has been completed, the marker establishes the connection through the line-link frame and the trunk-link frame between the alarm station and the trunk of FIG. 3. At this time the marker maintains ground on conductor 303 to mark the trunk busy.

The bridge, supplied by the alarm sensor, completes a circuit from battery, through the lower winding of relay 304, back contacts of relays 305 and 306, conductor 307, by way of the trunk-link frame and the line-link frame, through the sensor bridge and back, by way of the line-link frame and trunk-link frame to conductor 308, back contacts of relays 305 and 306, upper winding of relay 304 to ground. Relay 304 operates in this circuit and connects ground to conductor 309 to inform the sender that the connection has been established.

The sender, in turn, connects ground to conductor 310, completing a circuit for relay 311, which operates and closes a circuit from ground, over a front contact of relay 304, conductor 312, front contact of relay 311 to battery through the winding of relay 313. Relay 313 operates and locks over one of its front contacts, back contact of relay 314, back contact of relay 315 to ground on conductor 312. Relay 313 connects ground to conductor 303 to hold the switches of the trunk-link frame and the line-link frame and thereby the connection between the alarm station and the trunk. The connection of ground to conductor 303 also serves to tell the marker that the connection between the sender and the trunk has been completed, permitting the marker to release.

The operation of relay 313 disconnects ground from timer 316 and connects battery thereto, starting a timing operation.

The sender now closes a bridge across conductors 317 and 318, completing a circuit for relay 400 in the trunk circuit of FIG. 4, which is located at the alarm bureau. This circuit may be traced from battery, through the lower winding of relay 400, back contact of relay 401, conductor 317, over the sender bridge to conductor 318, back contact of relay 401 to ground through the upper winding of relay 400. Relay 400 operated, closes an obvious circuit for relay 402. Relay 402 closes a circuit from ground, over its front contact, back contact of relay 403 to battery through the winding of relay 401. Relay 401 operates and reverses the connection of battery and ground to conductors 317 and 318 to start a reverse battery "wink" to the sender.

Relay 402, in operating also closes a circuit from ground at key 405, front contact of relay 402 to audible alarm 406, to alert the attendant at the alarm bureau. In addition relay 402 also removes ground from and connects battery to timer 404.

Timer 404 measures off a brief time interval and then operates relay 403, which locks through its front contact under the control of relay 402. The operation of relay 403 releases relay 401 and thereby terminates the "wink" signal to the sender.

The sender responds to the "wink" signal to transmit the called line designation to the alarm bureau in the form of multifrequency pulses which pass through condensers 407 and 408 to the multifrequency receiver 410. To indicate that a complete designation has been transmitted, the sender then transmits a start signal.

In normal telephone use, the sender transmits the called line designation first, so that the extension of the call may proceed while the calling line designation is transmitted for charging purposes. When used for calls to the alarm bureau, the called line number is of no interest and the trunk circuit is arranged to cancel this registration.

In response to the "start" signal, following the called line number, relay 411, associated with the multifrequency receiver 410, operates, connecting ground to conductor 412, completing a circuit over back contact of relay 409, front contact of relay 402 to battery through the winding of relay 413. Relay 413 operates and locks over front contact of relay 402, front contact of relay 413, conductor 417 to ground over key 405. Relay 413 also closes a circuit from ground, over back contact of relay 409, front contact of relay 413 to conductor 416 to release the multifrequency receiver 410 and any records which may have been set up on the digit register 419 and the visual display 420. When all of the registers are clear, relay 411 releases, connecting ground to conductor 417 to hold relay 413 operated, if the attendant operates key 405 prematurely. Relay 411 also connects ground to conductor 418, completing a circuit over front contact of relay 413, front contact of relay 402 to battery through the winding of relay 409. Relay 409 operates and locks under the control of relay 402 to ground at its own front contact.

With relays 409 and 413 both operated, the pulsing circuit extends from condensers 407 and 408 over front contacts of relays 409 and 413 and conductors 414 and 415 to the receiver 410. Relay 409 closes a circuit from battery through the winding of relay 401, front contact of relay 409 to conductor 417 and ground. The operation of relay 401 transmits a reverse battery signal to the sender to start transmitting the calling line number. Relay 401 remains operated until relay 411 reoperates, even if the attendant operates key 405 before the complete number had been received.

When the sender transmits the "start" signal after completing the calling line number, the sender releases, releasing hold magnet 302 and relay 311. With the relay 311 released, conductor 317 and 318 are extended over front contacts of relay 313 and back contacts of relay 311 to the winding of relay 319. Relay 319 does not operate with relay 401 operated.

With relay 411 operated, following the second "start" signal, the operation of key 405 by the attendant, silences the audible alarm and releases relay 401 to terminate the reverse battery signal. It also releases relay 413, thereby connecting condensers 407 and 408 over front contacts of relay 409 and back contacts of relay 413 to the telephone set 421.

With relay 401 released, the current flow through relay 319 is such that relay 319 closes its contact, connecting ground to conductor 320. Ground on conductor 320 provides a substitute locking circuit for relay 313. Ground on conductor 320 also completes a circuit over back contact of relay 314, front contact of relay 313, back contact of relay 305 to battery through the winding of relay 306. Relay 306 reverses the connection of relay 304 to the conductors 307 and 308.

Assuming that the arrangement of FIG. 1B is used at the alarm station, the reversal of the connection of relay 304 to the line is effective to operate the polar relay at the alarm station, which, in operating removes the bridge from the line, thereby releasing relay 304. If the arrangement of either FIG. 1A or FIG. 1C is used, the normal central office battery may be supplied to the lower winding of relay 304 over a back contact of relay 306, and the high voltage battery required to blow the fuse at the alarm station then supplied over a front contact of relay 306.

With relay 304 released, a circuit is closed from battery, through the winding of relay 305, front contact of relay 306 to ground at the back contact of relay 304. Relay 305 operates in this circuit and locks over front contact of relay 305, back contact of relay 314 to ground at a front contact of relay 313.

With relay 305 operated, relay 304 is disconnected from the incoming trunk conductors and remains released. The operation of relay 305 also opens the circuit of relay 306, and relay 306 releases.

With relay 305 operated, ringing current is connected, through the windings of relay 321 to conductor 307, in an attempt to signal the working telephone associated with the alarm station. Ringing tone is transmitted to the attendant at the alarm bureau through condensers 322 and 323.

If the ringing signal is answered at the working telephone on the same line with the alarm network, the ringing trip relay 321 operates, completing a circuit over ground, over the contact of relay 321, front contact of relay 305 to battery through the winding of relay 314. Relay 314 operates, locking over its front contact to ground over a front contact of relay 313. The operation of relay 314 opens the locking circuit of relay 305, which releases, recompleting the previously traced circuit of relay 304, which reoperates under the control of the telephone set.

The attendant at the alarm bureau is now in voice communication with the working telephone and can receive any information available.

To disconnect, the attendant restores key 405, again connecting ground to conductor 417 and closing a circuit over front contact of relay 409 to battery through the winding of relay 401. Relay 401, in operation, reverses the connection of battery and ground through the windings of relay 400 to the winding of relay 319. Relay 319, therefore, releases disconnecting ground from conductor 320, and opening the locking circuit of relay 313. Relay 313 in releasing, opens the trunk loop to the alarm bureau, releases relay 314 and removes ground from conductor 303 to release the connection with the working telephone.

The release of relay 313 also disconnects relay 319 from the trunk conductors 317 and 318, thereby opening the circuit of relay 400 at the alarm bureau, releasing relay 400. The release of relay 400 in turn releases relay 402. Relay 402, in releasing, releases relays 409 and 403, and also restores the multifrequency receiver to normal, in turn restoring the digit register 419 and the visual display 420, completing the restoration of the alarm bureau to normal. The release of key 405 reclosed the circuit for the alarm 406, which again sounds. The release of relay 402 opens the circuit for alarm 406, giving an indication to the attendant that restoration has been completed.

If no answer is received from the working telephone, the attendant, after a reasonable interval, restores key 405, which results in the release of relay 319 as previously described. The release of relay 319 releases relay 313, which releases relays 306 and 305 to cut off ringing and release the trunk as above described.

If the attendant at the alarm bureau is slow in responding to the alarm signal, so that timer 316 completes its operation before the attendant operates key 405, relay 315 operates and locks under the control of relay 313. Since relay 319 has not been operated, the operation of relay 315 opens the locking circuit of relay 313 and that relay releases slowly, opening the loop to the alarm bureau and removing ground from conductor 303 to restore the circuits at both ends of the trunk of FIG. 3 to normal.

Release of the link switches restores supervision of the alarm line to its line relay, which is reoperated by the bridge closed by the alarm sensor contact. Operation of the line relay causes the entire sequence of reporting the alarm to be restarted and carried through as above described.

The changes in the marker and register required to handle an alarm are shown in FIG. 5. This shows a two conductor telephone line having a tip conductor 515 and a ring conductor 516 extending from a subscriber's premises to a central office network. The telephone line has a telephone station 519 and an alarm network connected thereto and is normally extended to a ground connection on the tip and through a line relay 518 in the central office network to a source of current whereby a bridge on the line in the subscriber's premises either at the telephone station or the alarm network will operate the line relay 518 in initiating a call. The telephone station 519 may be a single party telephone with the ringer and its condenser bridged across the line or it may be a ring station of a two party line with its ringer and its condenser connected to the ring conductor 516. The alarm network consists of a bridge connected to the two conductors 515 and 516 having in series the three elements, first a slow release relay 530, second a normally open circuit sensor 531, and third a normally closed circuit means 532 here shown as a fuse. When an alarm condition arises and the sensor 531 operates this bridge is completed so that the relay 530 is operated in series with the line relay 518. The source of current connected to the line relay 518 is sufficient to operate both relays 518 and 530 but is insufficient to blow the fuse 532. The operation of the relay 530 places a ground through the resistor 523 on the tip conductor 515 and thus marks the line as showing a call from a tip station on a simple two party line or from an alarm network on a combined telephone and alarm line.

A special class relay 500 (CAX) is provided for alarm calls and this relay is operated over a cross-connection 525 in the line link frame circuit when the marker is ready to set up the connection with the originating register. With class relay 500 operated, the usual class of service relay 501 is operated in the marker, as well as an added alarm class relay 502. While the marker is connected with the originating register, the regular class of service relay 503 (CSX) of the register is operated, as well as an added alarm class relay 504 (AC) under the control of the marker class relay 500 (CAS). Relays 503 and 504 are locked, independent of the marker. The originating register is connected through the line and trunk switches with the calling line as described in the previously identified Busch Patent.

It may be noted that if the line to the telephone is a two party line another class relay 500 will be used rather than the relay shown since two party service as well as alarm service must be provided.

It will be remembered that the alarm signal mark consists of ground, through 1000 ohm resistance 523, connected to the tip conductor, simulating a call from a tip party subscriber. When the connection between the register and the calling line has been completed, ground is connected to conductor 514, and, with the class of service relay 503 operated a circuit is closed from ground on conductor 514, front contact of relay 503, back contact of relay 504 (TPT), to battery through the winding of relay 506 (TPA). Relay 506 operates and connects tip conductor 515 and ring conductor 516 together and through the winding of relay 507 (TP) thus making the party test. It may be noted that during the party test the current for energizing relay 530 is disconnected but this relay has slow release characteristics and will maintain the tip ground 523 for sufficient time for the party test.

The ground through resistor 523 connected to the tip conductor 515 causes the operation of relay 507 (TP) which in turn closes a circuit for operating relay 508 (TPY) to indicate the completion of the first tip party test.

When relay 506 was operated, it removed a shunt from timer 510 and the timer functions to measure a time interval sufficient for the completion of the first party test. At the end of the measured time interval, the timer 510 operates relay 505 which opens the circuit of relay 506 and that relay releases.

With the alarm class relay 504 operated, the operation of relay 508, in response to the first party test, closes a circuit from ground, over a front contact of relay 508, front contact of relay 504, back contact of alarm release relay 512 (AR), controlled by the alarm number generator 511, through the alarm code relay 509 (ACD) to battery. Relay 509 operates, closes a circuit for starting the alarm generator 511 and connects the alarm generator 511 to the winding of line relay 518 (L) and the dial tone coil 517.

Generator 511 may be of any desired type. For use with the originating register being described, it must simulate dial pulses and be appropriately controlled to send a plurality of series of dial pulses in accordance with the designation of the alarm bureau, which will be registered under control of line relay 518. After the last series has been sent, it should operate relay 512 to release relay 509, so that the line relay 518 and tone coil 517 in the register may be connected over back contacts of relays 509 and 506 to conductors 515 and 516 which extend to the tip and ring of the calling line.

When the designation of the alarm bureau has been registered, the second tip party test is made, the originating register marker connector is operated to connect the register with the idle marker, the designation of the alarm bureau is transferred to the barker and the register is released in the manner described in the above identified Busch Patent.

The marker then sets up a connection between the line originating the alarm call and the alarm bureau, in general following the operations described in the Busch Patent. However, the designation of the alarm bureau is so selected that the marker will use an outsender arranged to be used in connection with automatic message accounting at a centralized accounting location and, therefore, equipped to register and transmit both the calling line designation and the called line designation. The details of such a sender are not included in the Busch Patent, but are well known in the art.

It may be noted that if the ring party on the line used for an alarm initiates a call, the same class relay will be operated and the two party test is applied. However, with no ground connected to the tip conductor, test relay 507 does not operate and relay 508 is not operated so that even with alarm class relay 504 operated, the alarm number generator 511 is ineffective and the line relay 518 is operated under control of the subscriber's dial to register the dialed designation. It is therefore apparent that the use of the tip conductor for the alarm signal does not prevent the use of the line for normal telephone service by the ring party subscriber or by any single party telephone station connected thereto.

The designation of the calling line is initially registered in the marker and transferred to the originating register in accordance with the location of the line in the primary line switch and is therefore the same for both parties on a two party line. This designation is passed, through the originating register marker connector, to the marker used for completing the connection and, if an outsender is required, is passed to the outsender. The outsender has access to a transverter circuit which translates the location designation into a numerical designation for charging purposes. The two parties on a party line normally have different designations and to enable the transverter to make proper translation the originating register connects ground to either conductor 520 for a ring party subscriber or to conductor 521 for a tip party subscriber under the control of relay 508.

For an individual line, the class relay does not call in the party test circuit shown in FIG. 1 and relay 508 is not operated. As above described, when a ring party is calling, the party test circuit does not operate relay 508. Therefore, for an individual line or for a ring party with relay 508 not operated, conductor 520 is grounded.

For a subscriber call from the tip party on a two party line the party test circuit is effective to operate relay 508 and ground is connected over a front contact of relay 508 and a back contact of alarm class relay 504 to conductor 521. Conductors 520 and 521 are also extended through the originating register marker connector to the marker, which passes the information to the outsender to control the transverter.

In the case where the tip conductor is used for alarm purposes no numerical designation is assigned to the tip party and, with relays 508 and 504 operated, ground is connected to conductor 520 so that the numerical designation of the ring party subscriber is supplied.

Where the polar relay of FIG. 1B is employed to dismiss the simulated call the attendant at the alarm bureau causes a reversal of the line current at the alarm station as described and the polar relay thereat through snap action of its contacts opens the bridge circuit to clear the line for unhindered telephone use.

What is claimed is:

1. In a telephone system, subscribers' two conductor lines each having a telephone connected thereto and each extending from a subscriber's premises to a central office network, an alarm network at said subscriber's premises connected to a subscriber's line thereat consisting of a series circuit connected between the two conductors thereof and normally offering no interference to the use of said line by said telephone, said series circuit having three elements consisting of, first, a normally open circuit sensor responsive to a given unstandard condition at said premises, second, a normally closed circuit means for opening said series circuit after it has been closed by said sensor, and third, means responsive to a circuit operation in said central office network for operating said normally closed means to clear said line for unhindered telephone use, and in which a telephone and an alarm network both connected to the same line will constitute a party line and in which said telephones may make calls and said alarm network may make simulated calls, means in said central office network for making a party test to determine whether a call on a line is a telephone call or a simulated call from said alarm network and means responsive thereto for switching a said call to connection with other lines reached over said central office network responsive to telephone station operation or, alternatively, for switching a said simulated call automatically to connection with an alarm bureau, and means in said central office network for controlling the class of service given to every line therein, an alarm line being identified as such by the combination of its class of service and its response to said party test.

2. A combined alarm and telephone system as set forth in claim 1, in which said third element of said series circuit is a relay responsive to line current from said central office network.

3. A combined alarm and telephone system as set forth in claim 2, in which said second element of said series circuit consists of normally closed contacts of said relay.

4. A combined alarm and telephone system as set forth in claim 3, in which said normally closed contacts are arranged for snap action whereby an open circuit may be produced and maintained thereby.

5. A combined alarm and telephone system as set forth in claim 4, in which said relay is polarized and will respond to reversal of the said line current from said central office network.

6. A combined alarm and telephone system as set forth in claim 1, in which said second element of said series circuit consists of a marginal means responsive to increased current flow from said central office network.

7. A combined alarm and telephone system as set forth in claim 1, in which said second element of said series circuit consists of a fuse.

References Cited

UNITED STATES PATENTS 3,120,579 2/1964 Stewart ---------- 179—5 X

JOHN W. CALDWELL, Primary Examiner

J. A. BRODSKY, Assistant Examiner

U.S. Cl. X.R.

179—5, 17; 340—164, 227